Figure 1:
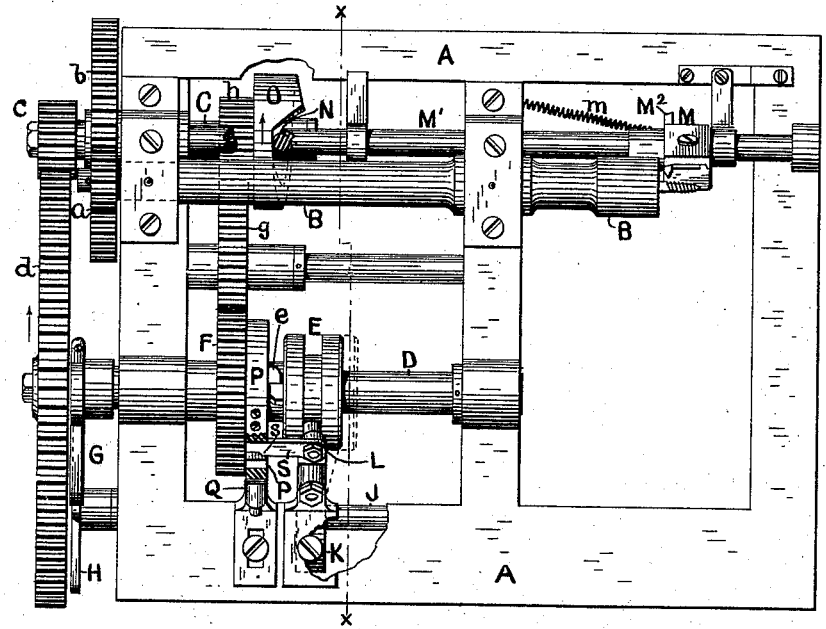

C. D. ROGERS.
Wood-Screw Machine.

No. 214,587. Patented April 22, 1879.

WITNESSES.

Edson S. Jones
J. C. B. Woods

INVENTOR.

Chas. D. Rogers
per
B. F. Thurston
atty.

UNITED STATES PATENT OFFICE.

CHARLES D. ROGERS, OF PROVIDENCE, RHODE ISLAND, ASSIGNOR TO THE AMERICAN SCREW COMPANY, OF SAME PLACE.

IMPROVEMENT IN WOOD-SCREW MACHINES.

Specification forming part of Letters Patent No. 214,587, dated April 22, 1879; application filed September 28, 1878.

*To all whom it may concern:*

Be it known that I, CHARLES D. ROGERS, of the city and county of Providence and State of Rhode Island, have invented a new and useful Improvement in Wood-Screw Machines; and I do hereby declare that the following specification, taken in connection with the accompanying drawings, making a part of the same, is a full, clear, and exact description thereof.

The improvement hereinafter described relates to machines for cutting threads upon screws, and is applicable to such machines as employ a cutting-tool traveling several times longitudinally of the screw to produce the thread, and which machines are organized with a main cam-shaft, from which all the principal movements of the machine are derived, and which makes one complete revolution only during the performance of the sequence of operations involved in supplying a blank to the holding-jaws, threading the shank of the blank by a succession of cuts, and discharging the finished screw.

The invention has for its object such a combination and arrangement of the screw-holding spindle, the cam-shaft, which makes only one revolution to many revolutions of the spindle, the primary gear, which gives movement to the leader, and which gear can be connected with or disconnected from its driving-shaft, the leader, which gives movement to the reciprocating threading-tool, and a friction-brake applied to the primary gear, that the number of idle revolutions of the screw-holding spindle—that is, revolutions in which no production of work is accomplished—will be reduced to a minimum.

In machines of the character specified, as usually heretofore constructed, the forward motion of the cutting-tool along the screw has been produced by a screw and nut device, and the stoppage of the movement of the said cutting-tool has depended upon the falling of a detent into notches in a disk-plate. These notches have been of V shape, and time has been required for the passage of the detent into and out of said notches, during which time the cutting-tool has not been acting upon the screw, and the screw-holding spindle has, therefore, been revolving to no useful end. Now when it is considered that every revolution or partial revolution of the shaft operating to move the cutting-tool beyond what is necessary is represented by an exaggerated number of revolutions of the screw-holding spindle—the latter making about twenty-four revolutions to one of the former—it will be seen that the speed of production is very much lessened, which is a fact of considerable importance.

To increase the speed of production is, therefore, the prime object of the improvement; and this desirable result is accomplished by means of an organization which employs in combination a cam upon the leader-shaft to move the cutting-tool the desired distance, a train of gears or equivalents to give revolution to the leader-shaft, a clutch to operate the gears, and a friction-brake device to instantaneously stop the revolution of said leader-shaft when the cutting-tool has finished its work and is in its farthest rearward position, when it is in readiness to commence its work upon a succeeding screw at the proper point.

My invention consists mainly in a combination of the primary gear, from which the movement of the leader is derived, the leader, which actuates the reciprocating tool-post, and a friction-brake to arrest rotation of the primary gear and its connecting train upon the instant that the primary gear is disconnected from its driving-shaft, whereby the number of idle revolutions of the screw-holding spindle is reduced to only such number as occur while that clutch-gear is being thrown in and out, which in machines of this class connects a driving-shaft with the train that drives the leader for actuating the tool-post.

Figure 2:
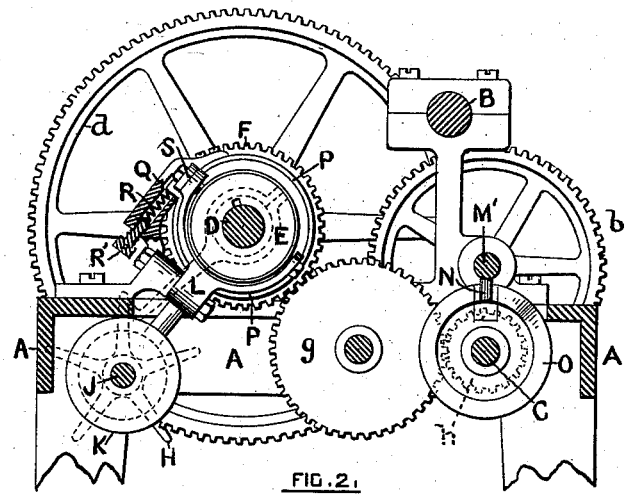
Figure 3:
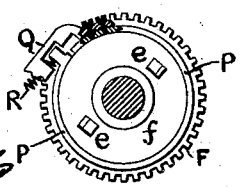
Figure 4:
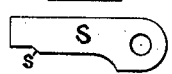

Referring to the drawings, Figure 1 represents a plan of a screw-threading machine having my improvement. Fig. 2 shows a vertical transverse section of the same on line $x$ $x$; and Figs. 3 and 4 represent details of construction.

As shown in Figs. 1 and 2, A represents the frame of the machine; B, the screw-holding spindle; C, the leader-shaft, and D the continuously-revolving shaft of the machine, upon which the clutch E is splined and the sleeve-gear F is mounted. Upon this shaft D, it is to be understood, that there is, in machines of the class to which this improvement relates, a hollow shaft or sleeve, which carries the various cams which govern the movements of the feeding mechanism and the action of the holding-jaws of the spindle. This sleeve or hollow shaft is commonly known as the "main cam-shaft," and in this specification where the phrase "main cam-shaft" is used it is to be understood as referring to that well-known adjunct of a modern screw-machine.

Inasmuch as the representation of the feeding devices and the mechanism for causing the spindle-jaws to open and close for releasing or for griping a screw-blank would add confusion to the drawings, the same, as well as the series of cams which control such mechanisms, are omitted.

Power is applied to the spindle B and transmitted to the shaft D by a train of gears, $a\ b\ c\ d$, the latter gear, $d$, being mounted upon the shaft D. The clutch E is operated to give motion to and stop the revolution of the leader-shaft C through a finger, G, upon the shaft D, which finger, during the revolution of the said shaft, engages with a star-wheel, H, upon a shaft, J, a cam, K, being mounted on the said shaft J, the said cam operating the clutch by means of a yoke-arm, L. This clutch engages with the projections $e$ upon the disk-hub $f$ of the sleeve-gear F, and through the said gear and gears $g\ h$ drives the leader-shaft C. The tool-post M is mounted on the shaft $M^1$, which is furnished with a depending arm, N, the said arm being held against the working face of the cam O by a spring, $m$, or equivalent means, to insure proper motion to the cutting-tool $M^2$.

Thus far has been described the mechanism used to give the cutting-tool its necessary longitudinal motions along the screw at the proper time, and were it not for the acquired momentum possessed by the leader-shaft, the said mechanism would be sufficient to stop the said tool at its proper position to commence a cut upon a subsequent screw. This momentum being present, however, it is necessary that some means be devised for stopping the revolution of the leader-shaft and its cam O, that the said tool may be left at the point above specified, and the operation of the said device must be so nearly instantaneous as to prevent the said cam from making further revolution, and thereby changing the proper relative position thereto of the tool-post. For this purpose a friction-brake is supplied, as shown at Figs. 1 and 3, and so arranged as to gripe the disk-hub $f$ of the gear F at the proper time, thereby instantly arresting the movement of the said gear, and, consequently, the revolution of the cam O. This brake consists of a flat split ring, P, surrounding the said disk-hub $f$, one of the ends of said ring being secured to a stationary arm, as at Q, and the other or free end being bent at right angles to take bearing against a spiral spring, as at R, which is seated on a screw, $R'$, to obtain more or less compression; or the said ring of itself may be a spring of sufficient force to obtain the desired result.

The action or non-action of this brake is made to depend upon the movement of the clutch E, which for the said purpose has its yoke L supplied with an arm, as at S, Figs. 1, 2, and 4, the outer end of the said arm being reduced in width, and one of its acting faces being furnished with an inclined plane, $s$.

When the clutch is withdrawn from engagement with the sleeve-gear F, and the griping force of the ring P is acting, the arm S is moved outward, and its narrow end lies between the ends of the ring P, which are separated a distance slightly greater than the width of the arm at this point. In this relation the arm S is inert; but when the clutch is brought into engagement the arm S is moved inward, and the inclined plane $s$ separates the ends of the ring P, thereby increasing the diameter of the said ring and destroying its griping force upon the sleeve-gear F, which latter is now free to revolve until the clutch E and its accompanying arm S are again withdrawn, the increased diameter of the ring being maintained and its griping force thereby temporarily destroyed during the revolution of the gear F by the increased width of the arm S at the points of engagement, as shown at Fig. 1.

The cam K, which acts to produce the engagement and disengagement of the clutch E and its accompanying arm S with the gear F and ring P, is timed to act to disengage the parts the instant the cutting-tool $M^2$ reaches its farthest rearward position after completing its cut upon a definite screw, and to produce engagement of the parts immediately upon the screw-holding spindle being supplied with a subsequent screw-blank, so that the said spindle is revolving to no useful purpose only during such time as is necessary for the clutching and unclutching operations to be performed, and as the said operations are nearly instantaneous the number of idle revolutions of the screw-spindle is reduced to a minimum.

Having described my improvement, I will proceed to the operation of that portion of a machine provided with it. It being desired to cut a certain length of thread, the leader-shaft C is supplied with a cam having the requisite rise to move the cutting-tool along the screw the proper distance. The number of threads to the inch and the number of cuts the threading-tool is to make being determined, the trains of gearing are arranged, and a star-wheel with the requisite number of arms is used to produce the proper number of revolutions of the shafts and the movements of the parts at the proper time. Suppose the machine to be in operation and the tool to be making its cuts, the screw-holding spindle B, leader C, and driving-shaft D, and both trains of gearing will be in revolution, the clutch being in engagement. At each revolution of the shaft D the finger G upon it engages with an arm of the star-wheel H and moves the clutch-cam K a portion of a revolution. When the threading-tool has commenced its last cut on a screw and is retreating by the force of the spring m and the contour of the cam O, the finger G will be found in engagement with an arm of the star-wheel H and moving the cam K, which, through the yoke L, is disengaging the clutch and allowing the brake-ring P to come into force by the withdrawal of the arm S. At the exact time when the threading-tool has reached its farthest rearward position, the depending arm N being then at the lowest point on the face of the cam O, as shown at Fig. 1, the disengagement of the clutch is effected, the brake-ring P is in full force upon the sleeve-gear F, and the revolution of the cam O instantly ceases. A new screw-blank is now supplied, during which operation the screw-holding spindle B and shaft D are in motion, the latter making one revolution and bringing the finger G into engagement with the star-wheel H, and through it partially revolving the cam K, thereby operating the arm S to remove the force of the brake-ring P and moving the clutch inward to engagement with the sleeve-gear F. This engagement is effected immediately upon the proper seating of the screw-blank in the spindle B, and the cam O is thereby started in revolution, and the operations above described are repeated.

The feeding mechanism and other parts of the machine not directly operating upon the movements of the threading-tool are omitted in the drawings and not described in this specification, they being well known and not material to the understanding of my improvement.

It is to be understood, however, that suitable feeding mechanism is combined with the machine by which screw-blanks are delivered one at a time to the revolving screw-holding spindle, and that such feeding mechanism is controlled as to the time of its action by the movement of the main cam-shaft.

In addition to the advantage which results from diminishing the number of non-producing revolutions of the screw-holding spindle, the combination herein described enables the machine to be run with safety at a higher degree of speed than under any previous arrangement has been practicable.

I am familiar with the machine described in the Letters Patent granted to Cullen Whipple, October 16, 1852, and disclaim everything therein shown.

What I claim as my invention, and desire to secure by Letters Patent as an improvement in screw-machines organized with a main cam-shaft, which makes one complete revolution only during the performance of the sequence of operations involved in supplying a blank to the jaws of the screw-holding spindle, threading the shank of the blank by a succession of cuts, and discharging the finished screw, is—

1. The combination of the primary gear from which the movement of the leader is derived, the leader which actuates the reciprocating tool-post, and a friction-brake to arrest the rotation of the primary gear and its connecting train upon the instant that the said primary gear is disconnected from its continuously-revolving driving-shaft, substantially as described, and for the purposes specified.

2. The combination of the continuously-revolving driving-shaft D, the detachable primary gear for giving movement to the leader mounted on such shaft, the leader which actuates the reciprocating tool-post, the spindle-shaft and its train connecting with the driving-shaft, and a friction-brake operating to arrest the rotation of the primary gear and its connecting train upon the instant that the said primary is unlocked from the driving-shaft, whereby the number of idle revolutions of the spindle-shaft are diminished, substantially as set forth.

3. The combination of the primary gear, from which, when locked with its driving-shaft D, the motion of the leader is derived, a friction-brake, as described, arranged to operate upon the said primary when the same is unlocked from the cam-shaft, and an arm, S, for controlling the brake, worked by the movable clutch connecting the driving-shaft with the primary gear, substantially as described, and for the purposes specified.

CHAS. D. ROGERS.

Witnesses:
  EDSON S. JONES,
  J. C. B. WOODS.